United States Patent
Zimmerman (10) Patent No.: US 11,511,979 B2
(45) Date of Patent: Nov. 29, 2022

(54) EASY HYDRAULIC JACK RETROFIT FOR A TRAILER

(71) Applicant: Jay Paul Zimmerman, Cantril, IA (US)

(72) Inventor: Jay Paul Zimmerman, Cantril, IA (US)

( * ) Notice: Subject to any disclaimer, the term of this patent is extended or adjusted under 35 U.S.C. 154(b) by 238 days.

(21) Appl. No.: 16/739,813

(22) Filed: Jan. 10, 2020

(65) Prior Publication Data

US 2020/0223674 A1    Jul. 16, 2020

Related U.S. Application Data

(60) Provisional application No. 62/792,265, filed on Jan. 14, 2019.

(51) Int. Cl.
*B66F 3/25* (2006.01)
*B60S 9/22* (2006.01)
*B60S 9/12* (2006.01)

(52) U.S. Cl.
CPC .................. *B66F 3/25* (2013.01); *B60S 9/12* (2013.01); *B60S 9/22* (2013.01)

(58) Field of Classification Search
CPC ...... B66F 3/25; B60S 9/12; B60S 9/22; B60S 9/08; B60D 1/66
See application file for complete search history.

(56) References Cited

U.S. PATENT DOCUMENTS

| | | |
|---|---|---|
| 4,345,779 A | 8/1982 | Busby |
| 5,011,119 A | 4/1991 | Harrington |
| 5,181,310 A | 1/1993 | Josephson |
| 5,865,499 A | 2/1999 | Keyser |
| 5,897,121 A | 4/1999 | Case |
| 5,911,437 A | 6/1999 | Lawrence |
| 6,598,886 B2 | 7/2003 | Baird et al. |
| 6,926,305 B2* | 8/2005 | Daniel ............... B60S 9/08 254/419 |
| 7,163,207 B2 | 1/2007 | Baird et al. |
| 8,590,417 B1 | 11/2013 | Bono et al. |
| 8,919,738 B2 | 12/2014 | Daniel |

(Continued)

OTHER PUBLICATIONS

Convert Your Trailer Jack to Hydraulic; Farm Show Magazine; Inventor: J.L. Sharp, (2007), 1 page.

(Continued)

*Primary Examiner* — Seahee Hong
(74) *Attorney, Agent, or Firm* — Goodhue, Coleman & Owens, P.C.

(57) ABSTRACT

A method of retrofitting a trailer having a crank jack with a jack housing and a jack leg into a hydraulic jack includes removing mechanical components from within the jack housing, the mechanical components comprising gearing of the crank jack, placing a hydraulic cylinder within the jack housing, wherein the hydraulic cylinder comprises a main cylinder and a ram piston extending outwardly therefrom as the main cylinder is filled with pressurized fluid, securing the hydraulic cylinder by fastening a top portion of the hydraulic cylinder to the jack housing using a fastener inserted through a hole in a platform positioned within the jack housing, and further securing the hydraulic cylinder by fastening the ram piston to the jack leg using a bolt extending through a pre-existing hole in the jack leg.

12 Claims, 7 Drawing Sheets

(56) References Cited

U.S. PATENT DOCUMENTS

| | | | |
|---|---|---|---|
| 10,000,189 B2* | 6/2018 | Zimmerman | B60S 9/08 |
| 2003/0209896 A1 | 11/2003 | Daniel | |
| 2004/0104381 A1* | 6/2004 | Sharp | B60S 9/12 |
| | | | 254/423 |
| 2004/0159827 A1 | 8/2004 | Drake, III | |
| 2006/0163551 A1* | 7/2006 | Coenen | B60S 9/12 |
| | | | 254/423 |
| 2007/0090333 A1* | 4/2007 | Drake | B66F 3/16 |
| | | | 254/103 |
| 2007/0210289 A1 | 9/2007 | Drake | |
| 2009/0008917 A1 | 1/2009 | Daniel | |
| 2009/0179400 A1 | 7/2009 | Plaats et al. | |
| 2012/0091411 A1 | 4/2012 | Hansen et al. | |
| 2014/0048759 A1 | 2/2014 | Seidel | |
| 2015/0137498 A1 | 5/2015 | Klassy | |
| 2016/0244030 A1* | 8/2016 | Lehman | B60S 9/08 |
| 2016/0325974 A1 | 11/2016 | Wilson et al. | |
| 2018/0056947 A1 | 3/2018 | Zimmerman | |
| 2019/0143947 A1 | 5/2019 | Hanlin | |

OTHER PUBLICATIONS

Easy Lifter Kit EZ6PNP—Zimmerman Trailers Website, Nov. 6, 2017, 2 pages.

Easy Lifter Kit EZ9CNP—Zimmerman Trailers Website, Nov. 6, 2017, 2 pages.

HTC Line 3000 PSi Trunnion Mount Cylinder; p. 12; 13th edition; www.HDDISTRIBUTORS.com (Year: 2018).

https://manuals.heartlandowners.org/?man=/Exterior/Stabs_n_Leveling/Lippert (Using Wayback Machine) (Year: 2009).

Hydraulic Front Landing Gear dated Oct. 14, 2009; found at http://manuals.heartlandowners.org/?man=/Exterior/Stabs_n_Leveling/Lippert (Year:2009), 14 pages.

International Search Report and the Written Opinion, PCT/US2017/048408 (dated Nov. 2, 2017), 10 pages.

Lippert Towable Master Manual; Lippert Components; extracted from: https://www.lci1.com/images/support/manuals/master-towable-manual.pdf (Year: 2015), 1 page.

Zimmerman Pro Series 12K Dropleg Jack; Zimmerman Trailers Parts Website (Aug. 1, 2017), 3 pages.

\* cited by examiner

EASY HYDRAULIC JACK RETROFIT FOR A TRAILER

PRIORITY STATEMENT

This application claims priority to U.S. Provisional Patent Application 62/792,265, filed on Jan. 14, 2019, and entitled Hydraulic jack retrofit for trailer, hereby incorporated by reference in its entirety.

FIELD OF THE INVENTION

The present invention relates to trailers. More particularly, but not exclusively the present invention relates to a simple and easy hydraulic jack retrofit for trailers, and more specifically for manual trailer jacks.

BACKGROUND

Trailers come with jacks such as a crank style drop leg jacks. However, this type of manually operated jack is often disfavored because of the amount of time and effort it takes to raise and lower the trailer. Some trailer owners choose to install an electric assist trailer jack. However, often times this is still problematic because of the substantial time it may take to lift and lower a trailer.

Trailer owners may remove the original manufacturer jack and replace it with a hydraulic jack. However, there are problems with doing so. For example, the time and expense of the install and rework necessary to install a hydraulic jack and the possibility of weakening the tongue or frame of the trailer as a result of the install are problematic. Such a retrofit involves cutting into the trailer, damaging the powder coating, paint or other finish of the trailer. Thus, this solution is particularly disfavored when the trailer is new or in good condition.

Trailer manufacturers may sell trailers with the crank style drop leg jacks and provide an option of hydraulic jacks. However, this can create problems for dealers who may need to maintain an inventory of a selection of different trailers some with the factory installed option and others without it.

Moreover, many trailer owners may not be sufficiently skilled or equipped to retrofit a trailer with a hydraulic jack, such that any solution for a hydraulic jack retrofit needs to be simple and straightforward and require as little time, effort, and skill level as possible.

The present inventor previously disclosed the invention described in U.S. Pat. No. 10,000,189 to Zimmerman, hereby incorporated by reference in its entirety. Despite the advantages discussed therein, what is needed are improved methods for retrofitting a crank style jack to a hydraulic jack, including methods which reduce or eliminate the need for cutting and otherwise simplify the process.

Therefore, what is needed is a hydraulic jack and installation method which is acceptable to trailer owners and addresses the problems with current electric and hydraulic jacks.

SUMMARY

Therefore, it is a primary object, feature, or advantage of the present invention to improve over the state of the art.

It is a further object, feature, or advantage of the present invention to provide a hydraulic trailer jack and a method of installation which allows a standard crank jack to be retrofitted or converted into the hydraulic jack.

It a still further object, feature, or advantage of the present invention to provide a hydraulic jack and a method of installation which can be performed in a reduced amount of time, with little effort and even when one's skill level is limited.

It is another object, feature, or advantage to provide a kit for converting a standard crank jack to a hydraulic trailer jack.

It is yet another object, feature, or advantage to provide a kit for converting a standard crank jack to a hydraulic trailer jack which requires few parts or components and yet is effective.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, a method of retrofitting a trailer having a crank jack with a jack housing and a jack leg into a hydraulic jack is provided. The method includes removing a top cap from the jack housing. The method further includes stripping mechanical components from within the jack housing, the mechanical components comprising gearing. The method further includes removing a worm screw mounting bracket from within the jack housing. The method further includes placing a hydraulic cylinder within the jack housing, wherein the hydraulic cylinder comprises a main cylinder and a ram piston extending outwardly therefrom as the main cylinder is filled with pressurized fluid. The method further includes securing the hydraulic cylinder to the jack housing by fastening the ram piston to the jack leg using a bolt extending through a pre-existing hole in the jack leg. The method further includes securing the hydraulic cylinder by fastening a top portion of the hydraulic cylinder to the jack housing. The method may further include drilling a first hole and a second in a side of the jack housing to allow for connection of hydraulic lines to the hydraulic cylinder. The method may further include a top cover over a top end of the hydraulic cylinder and onto the jack housing. The method may further include sealing the top cover with a grommet. The method may further include connecting hoses to ports on the hydraulic cylinder.

According to another aspect, a method of retrofitting a trailer having a crank jack with a jack housing and a jack leg into a hydraulic jack is provided. The method may include providing a kit comprising a hydraulic cylinder comprising a main cylinder and a ram piston extending outwardly therefrom as the main cylinder is filled with pressurized fluid. The method may further include stripping mechanical components from within the jack housing, the mechanical components comprising gearing. The method may further include removing a worm screw mounting bracket from within the jack housing, placing the hydraulic cylinder within the jack housing, securing the hydraulic cylinder to the jack housing by fastening the ram piston to the jack leg using a bolt extending through a pre-existing hole in the jack leg, securing the hydraulic cylinder by fastening a top portion of the hydraulic cylinder to the jack housing.

According to another aspect, a method of retrofitting a trailer having a crank jack with a jack housing and a jack leg into a hydraulic jack is provided. The method includes removing mechanical components from within the jack housing, the mechanical components comprising gearing of the crank jack, placing a hydraulic cylinder within the jack housing, wherein the hydraulic cylinder comprises a main cylinder and a ram piston extending outwardly therefrom as the main cylinder is filled with pressurized fluid, securing the hydraulic cylinder by fastening a top portion of the hydraulic cylinder to the jack housing using a fastener inserted through a hole in a platform positioned within the jack housing, and further securing the hydraulic cylinder by fastening the ram piston to the jack leg using a bolt extending through a pre-existing hole in the jack leg. The method may further include drilling a first hole and a second in a side of the jack housing to allow for connection of hydraulic lines to the hydraulic cylinder. The method may further include placing a top cover over a top end of the hydraulic cylinder and onto the jack housing. The fastener may be a bolt. The method may further include connecting hoses to ports on the hydraulic cylinder.

According to another aspect, a method of retrofitting a trailer having a crank jack with a jack housing and a jack leg into a hydraulic jack is provided. The method may include providing a kit comprising a hydraulic cylinder comprising a main cylinder and a ram piston extending outwardly therefrom as the main cylinder is filled with pressurized fluid, removing mechanical components from within the jack housing, the mechanical components comprising gearing of the crank jack, placing the hydraulic cylinder within the jack housing, wherein the hydraulic cylinder comprises a main cylinder and a ram piston extending outwardly therefrom as the main cylinder is filled with pressurized fluid, securing the hydraulic cylinder by fastening a top portion of the hydraulic cylinder to the jack housing using a fastener inserted through a hole in a platform positioned within the jack housing, and further securing the hydraulic cylinder by fastening the ram piston to the jack leg using a bolt extending through a pre-existing hole in the jack leg. The kit may further include top cover and the method may further include placing the top cover over a top end of the hydraulic cylinder and onto the jack housing and securing the top cover. The method may further include drilling a first hole and a second in a side of the jack housing to allow for connection of hydraulic lines to the hydraulic cylinder and connecting the hydraulic lines to a first and a second cylinder port through the first hole and the second hole.

According to another aspect, a hydraulic jack retrofitted from a manual crank style jack is provided. The retrofitted jack may include a jack housing, a hydraulic cylinder within the jack housing, wherein the hydraulic cylinder comprises a main cylinder and a ram piston extending outwardly therefrom as the main cylinder is filled with pressurized fluid, a platform positioned within the jack housing, a hole in the platform, a first fastener such as a bolt inserted through the hole in the platform and into a top portion of the hydraulic cylinder to secure the hydraulic cylinder to the jack housing, and a second fastener such as a bolt securing the ram piston of the hydraulic cylinder to a jack leg, the second fastener extending through a pre-existing hole in the jack leg, and a jack stand operatively connected to the jack leg. The hydraulic jack may further include a housing portion between the jack leg and the jack housing and a protective housing extending orthogonally outward from the housing portion. The hydraulic jack may further include a first opening and a second opening in the jack housing for connecting hydraulic lines to the hydraulic cylinder. The hydraulic jack may further include a cover positioned on a top end of the jack housing.

DETAILED DESCRIPTION

The present invention relates to a hydraulic jack retrofit for trailers and specifically manual trailer jacks. A trailer and tongue having an original manufacturer drop leg jack which can be welded to the frame and/or tongue of the trailer may be retrofitted according to one aspect of the present invention to provide a hydraulic jack. For example, the drop leg jack may be a Jack 10K Lift Dropleg SW GN (Pro Series) such as may be present on a PJ Trailer. Of course, any number of other drop legs jacks on any number of different brands or types of trailers may be used. The present invention provides for retro-fitting the manual drop leg jack without cutting the jack from the trailer or disturbing the powder coating, paint, or other finish of the trailer.

Figure 1:
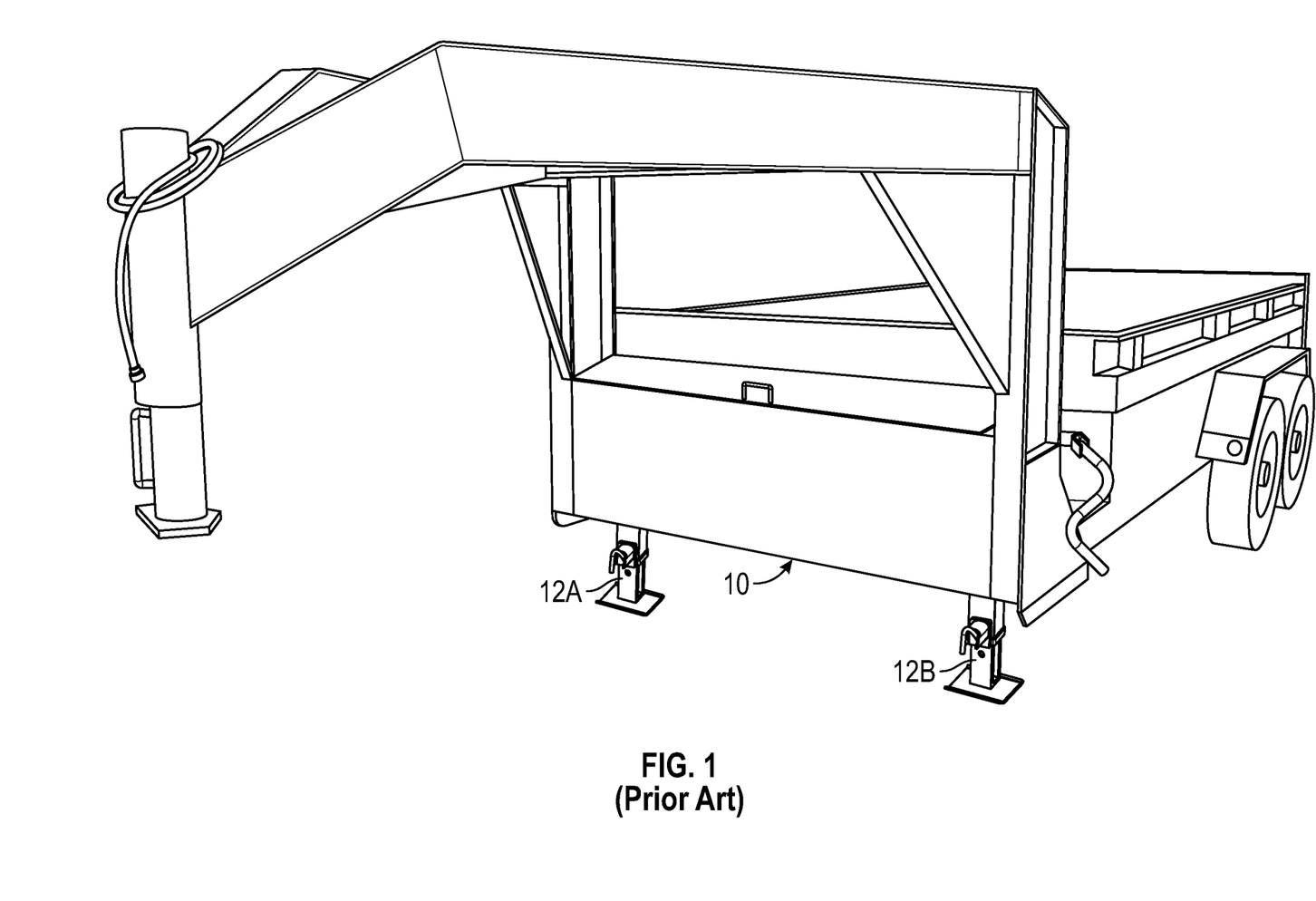
FIG. 1 illustrates one example of a trailer, in this instance, a gooseneck dump trailer with original manufacturer crank-style drop leg jacks.

FIG. 1 illustrates one example of a trailer 10, in this instance, a gooseneck dump trailer with original manufacturer drop leg jacks 12A, 12B. Although a particular example of a prior art trailer is shown, it is to be understood that any number of different types of trailers may be used as the present invention relates to retrofitting an existing trailer with one or more manual crank style drop leg jacks to one or more hydraulic jacks and not the particular configuration of the trailer.

Figure 2:
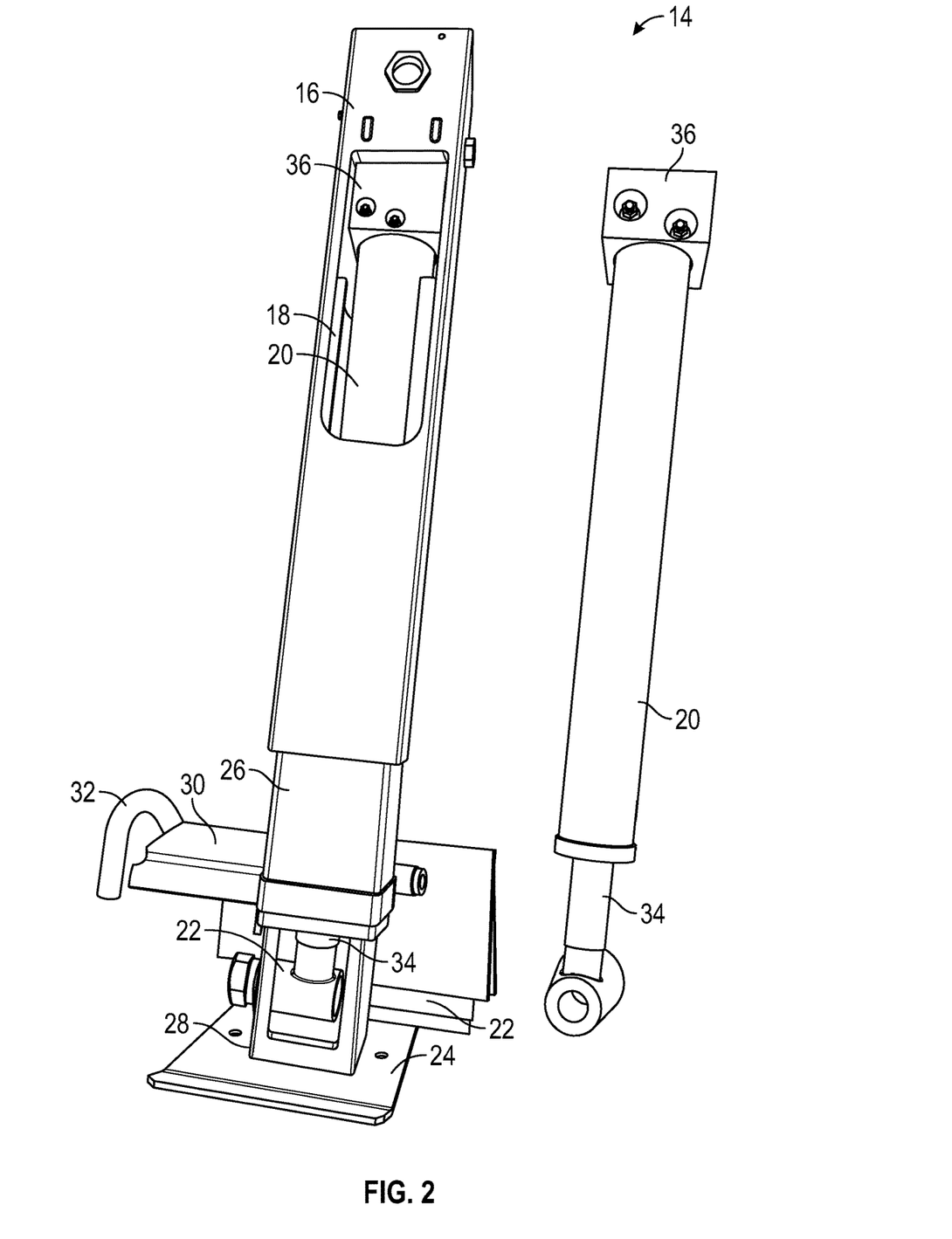
FIG. 2 illustrates the crank-style drop leg jack as modified to include a hydraulic cylinder.

FIG. 2 illustrates an example of a drop leg jack retrofitted to a hydraulic jack 14. The hydraulic jack 14 is a retrofit of the manual crank style jack such as shown in FIG. 1 as drop leg jack 12A or 12B. Returning to FIG. 2, the hydraulic jack 14 has a jack housing 16. Adjacent to the hydraulic jack 14 is a hydraulic cylinder 20 identical to the hydraulic cylinder 20 present within the jack housing 14. The hydraulic cylinder 20 shown next to the jack housing 16 is simply to assist in showing the orientation of the hydraulic cylinder 20 within the jack housing 14. In addition, a portion 18 of the jack housing 16 is cut away so that the hydraulic cylinder 12 within the jack housing 14 is partially visible. However, the jack housing 14 would not normally be cut in this manner as there is no need to do so, it is merely helpful in understanding or demonstrating the invention, in particular the placement and orientation of the hydraulic cylinder 20.

Note that in the retrofitted manual crank jack to hydraulic jack, there is a jack stand portion 24 at the bottom of a dropdown leg 28 of the hydraulic jack 14. A housing portion 26 is positioned over a portion of the leg 28. A protective covering 30 extends outwardly and generally horizontally from the dropdown leg portion to cover a portion of a pin 32.

As shown in FIG. 2, the jack housing 16 is positioned over the housing portion 26 and dropdown leg 28 which extends to a jack stand portion 24 or foot. A portion of the wall of the dropdown leg 28 is cutout to assist in showing the mounting of the hydraulic cylinder 20, however, it is to be understood that removal of a portion of the wall of the dropdown leg 28 is simply for illustrative purposes. A hydraulic cylinder 20 is positioned within the jack housing 16 and extends into the dropdown leg 28. A piston rod 34 of the hydraulic cylinder extends downwardly with ram 22 attached to the dropdown leg 28 of the hydraulic jack 14. At the opposite end of the hydraulic cylinder is a block 36 which may include safety valves.

Figure 3:
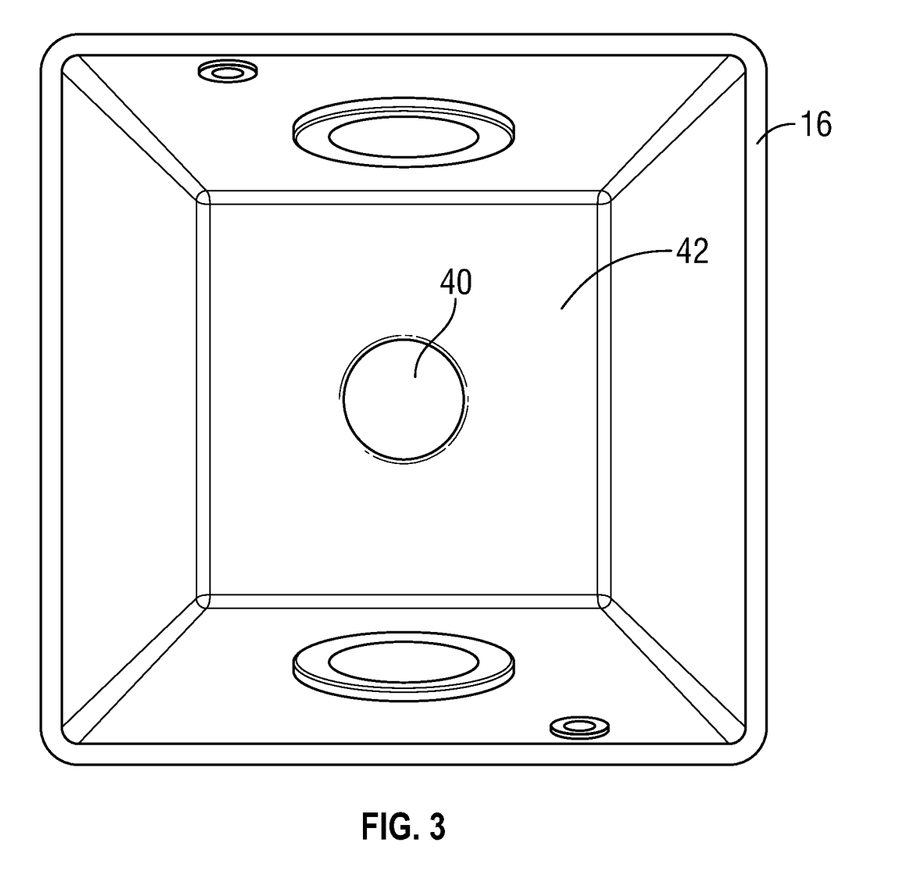
FIG. 3 illustrates a top view of a manual trailer jack during the retrofitting process.

FIG. 3 illustrates a top view of a manual trailer jack during the retrofitting process. A jack housing 16 is shown with a central hole 40 positioned at a plate 42. Inner mechanisms of the manual trailer jack have been removed including the worm gear and other gear mechanisms. A hydraulic cylinder will be placed within the jack housing with the block of the hydraulic cylinder against this plate and a bolt or other fastener may be inserted through the hole 40 to secure the block of the hydraulic cylinder to the jack housing 16.

Figure 4:
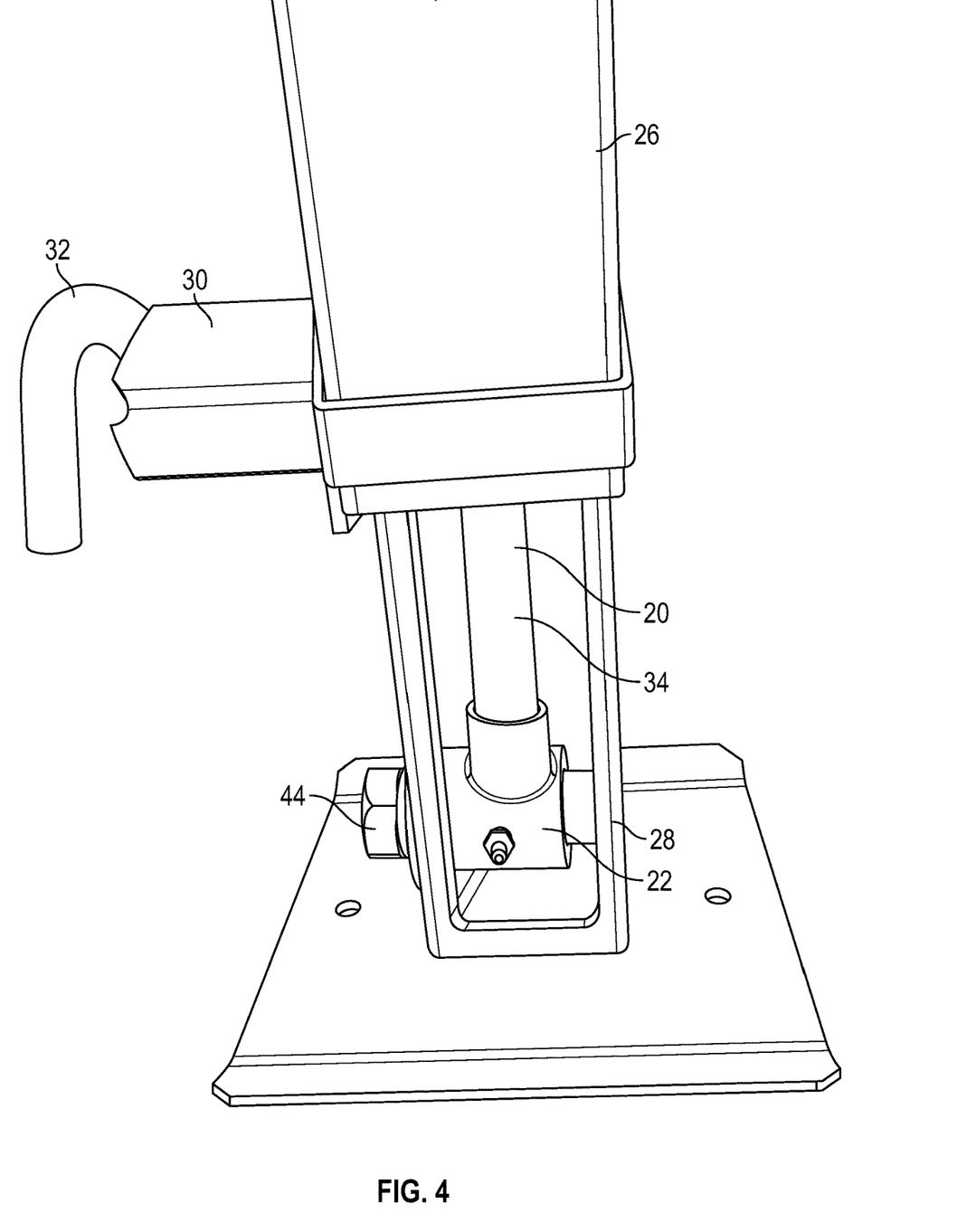
FIG. 4 further illustrates the jack as modified to include a hydraulic cylinder.

FIG. 4 further illustrates the jack as modified to include a hydraulic cylinder 20. A portion of a wall of the dropdown leg 28 has been removed in order to show the hydraulic cylinder 20 fitted therein. Note that the hydraulic cylinder 20 is positioned with the ram 22 and piston rod 34 directed downwardly. The ram 22 is secured to the dropdown leg 28 such as through the use of a bolt 44 or other fastener. If a worm gear mounting bracket was present, it has been removed. The worm gear mounting bracket of different commercial manual trailer jacks may be removed in different ways. For example, the worm gear mounting bracket may be removed by cutting. Alternatively, some worm gear mounting brackets may be removed by removing bolts which fasten the worm gear mounting brackets to the dropdown leg 28 or other portions of the housing. In addition, commercial manual trailer jacks typically include a spring. This spring has also been removed.

Figure 5:
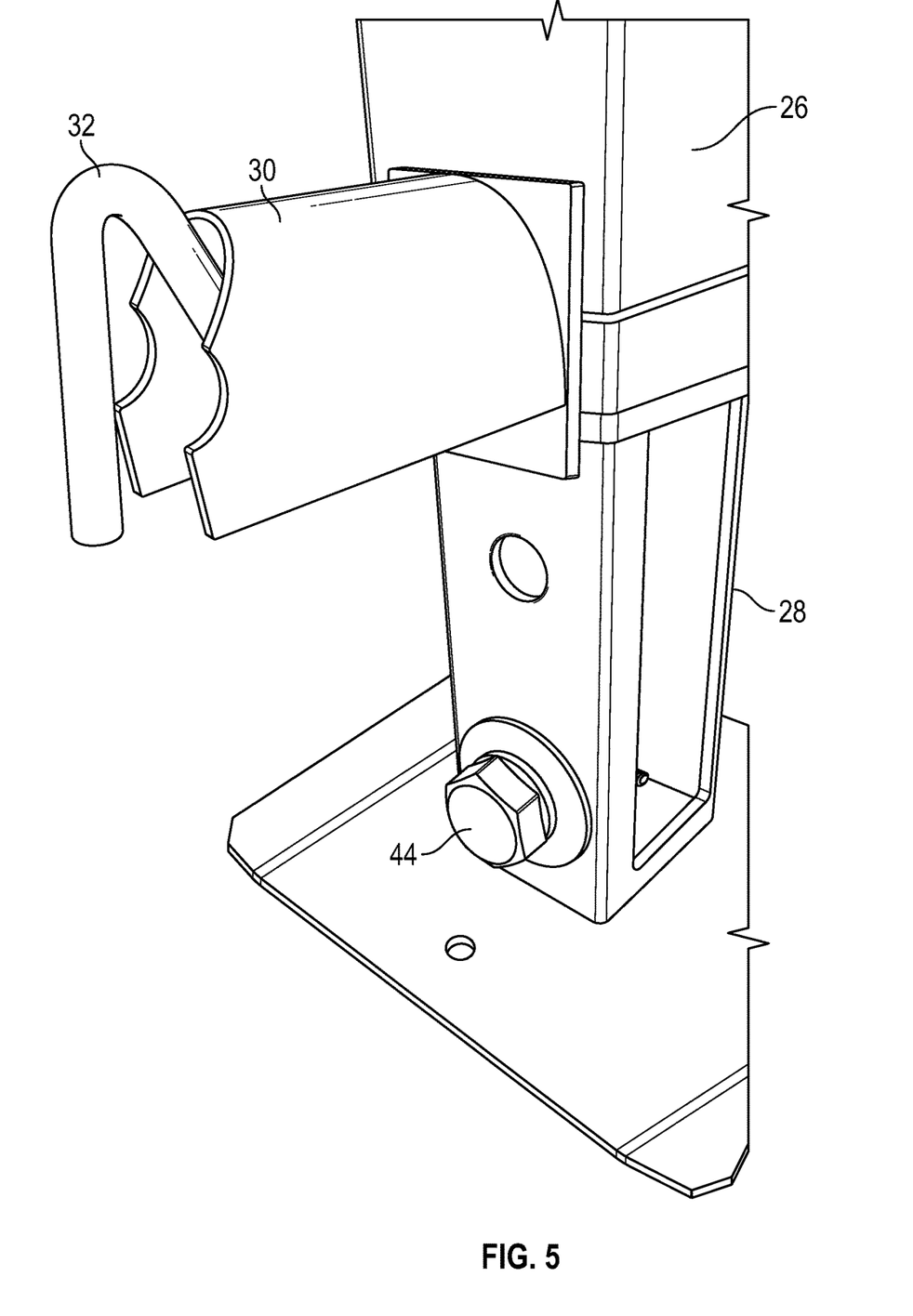
FIG. 5 provides a view of a bottom portion of the hydraulic jack after retrofitting.

FIG. 5 provides a view of a bottom portion of the hydraulic jack 14 after retrofitting. Note that one of the original factory holes in the dropdown leg 28 of the jack is being used with a bolt 44 to secure the leg 28 to the ram of the hydraulic cylinder.

Figure 6A:
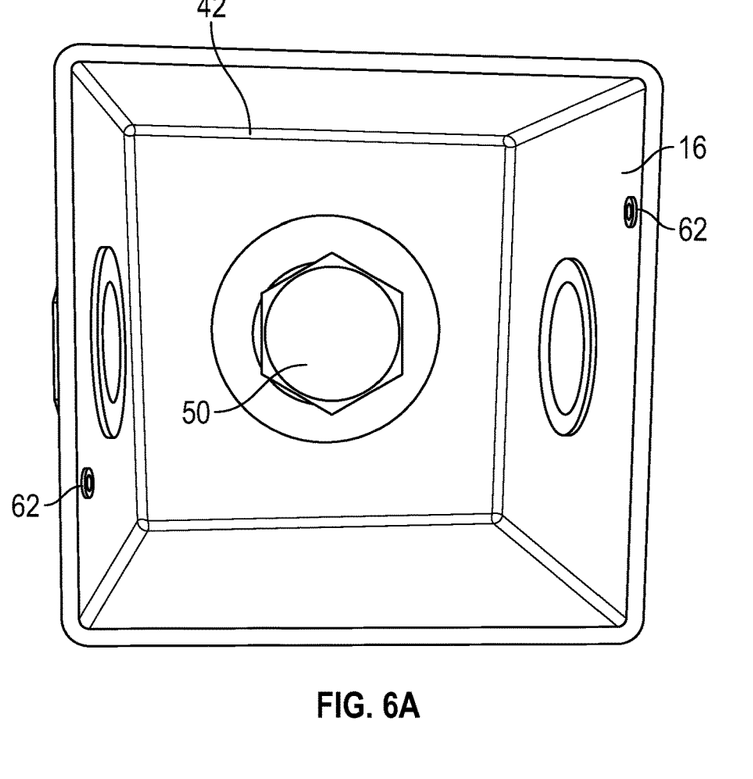
FIG. 6A is a top view of the jack housing.
Figure 6B:
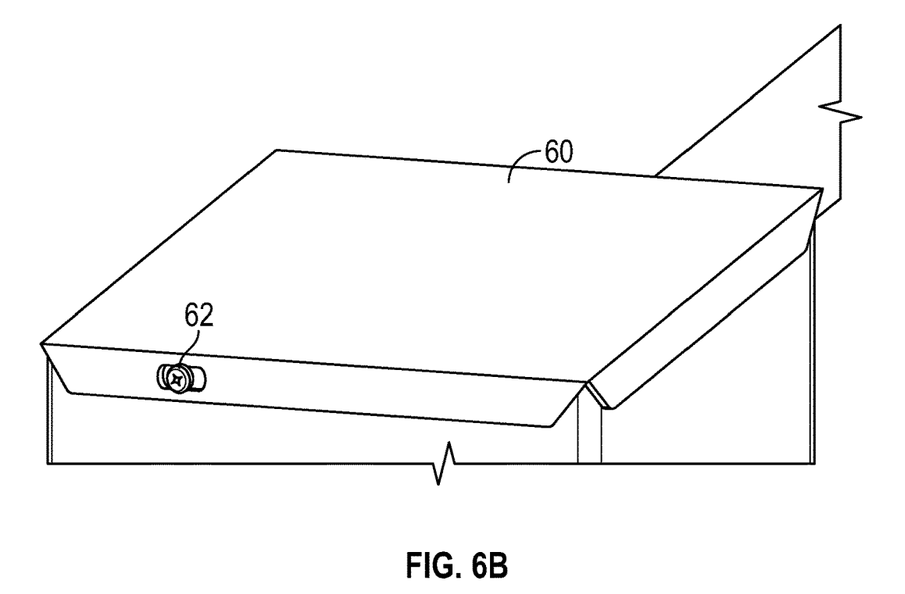
FIG. 6B illustrates a cover which may be placed on the top of the jack housing.

FIG. 6A is a top view of the jack housing 16. Note that a bolt 50 is shown which is used to secure the plate 42 of the jack housing 16 to the block of the hydraulic cylinder. As shown in FIG. 6B, a cover 60 may be positioned on the top of the jack housing 16 if desired by inserting fasteners through holes 62. The cover may be made of stainless steel with a tread pattern or may be made of other suitable material. Because the hydraulic cylinder is short enough to fit within the jack housing 16 underneath the plate 42 of the jack housing, it is not necessary to cut or remove the plate 42 of the jack housing 16.

Figure 7:
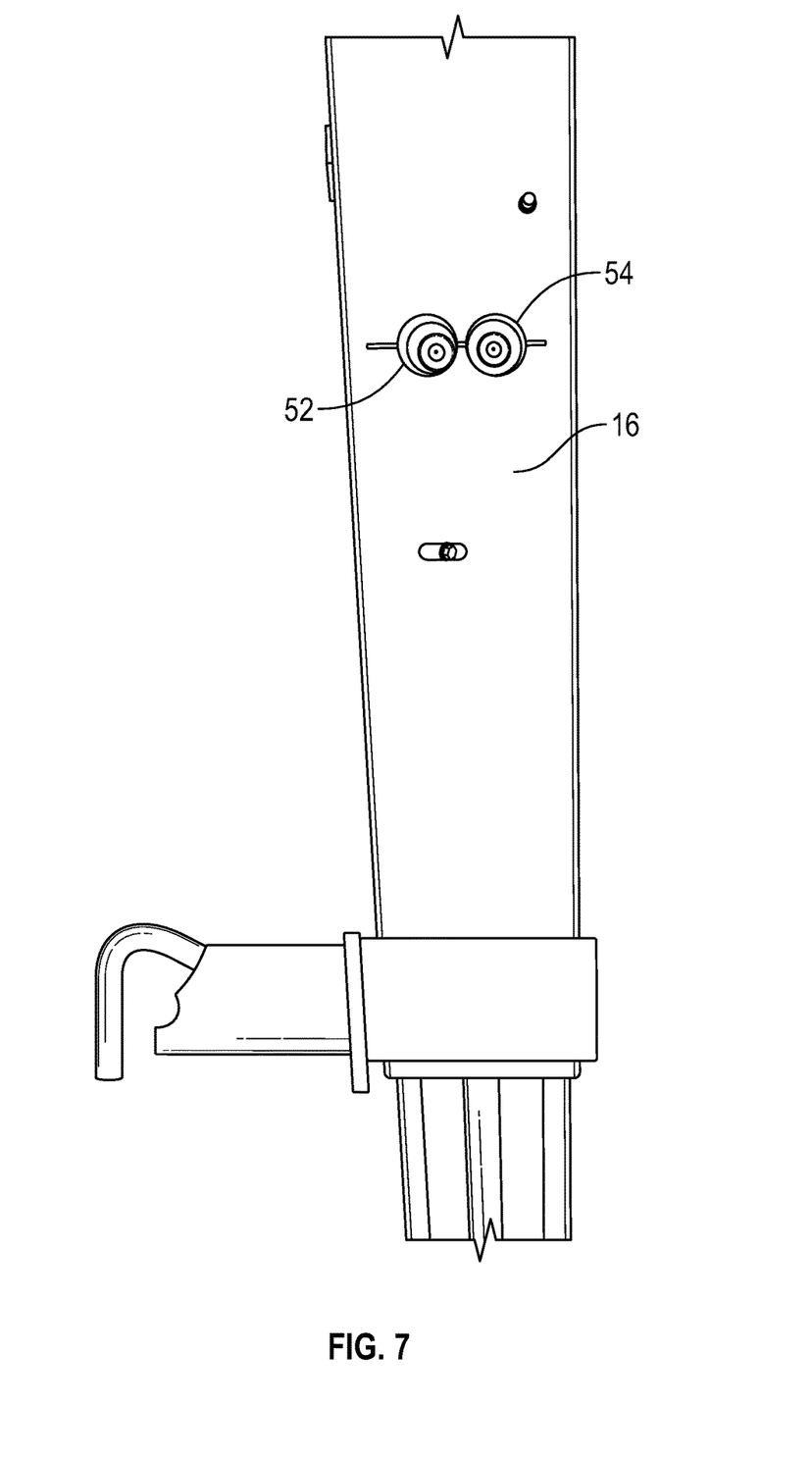
FIG. 7 is another view of a top portion of the jack housing after two holes have been drilled.

FIG. 7 is another view of a top portion of the jack housing after two holes 52, 54 have been drilled. The two holes are drilled in order to run hydraulic lines to the hydraulic cylinder. A kit for retrofitting a manual crank style jack to a hydraulic jack may include not just the hydraulic cylinder but also a hydraulic pump, hoses, a hydraulic splitter, battery, or other items.

One of the benefits of this form of retrofitting a manual trailer jack to a hydraulic jack using the method and/or kit described is the simplicity in which this can be accomplished. In particular, depending upon the model of a manual trailer jack no cutting is required. If cutting is required it is only to remove the worm gear mounting bracket. In addition, there need only be two holes drilled in the jack housing in order to accommodate the hydraulic cylinder hoses. This significantly reduces the complexity of the process allowing the conversion to be completed in a limited amount of time and with a limited amount of resources. Of course, this conversion process also does not involve cutting into the trailer, damaging the powder coating, paint or other finish of the trailer. Thus, this solution is particularly disfavored when the trailer is new or in good condition. A skilled person can complete the process in under an hour.

A hydraulic retrofit kit may be provided to allow for the removal of the manual jack and replacement with a hydraulic jack. The kit may include the hydraulic cylinder itself along with a hydraulic pump, battery, hydraulic splitter block and hoses (e.g. six hoses) to connect with the hydraulic jack. The hydraulic pump, splitter, and hoses may be of conventional design. The kit may also include a hole saw bit which can be used in cutting out the worm gear mounting bracket if needed. The kit may also include a top cover or cap to cap the top portion of the hydraulic cylinder along with the grommet. Thus, after retrofit, the original leg remains as does the housing for the manual jack.

In installing the retrofit kit to transform a manual crank style jack to a hydraulic jack on a trailer, the process may include first, blocking trailer wheels to ensure that the trailer does not move for safety reasons. Next, the trailer may be lifted with another jack and secured with jack stands. The adjustable drop leg of the crank style jack may then be lifted to its highest setting to aid in removal at a later step. The top cover may then be removed from the jack. The crank and cross shaft from the jack may then be removed. Next, the spring in the top of the jack housing may be compressed and the roll pin securing the shaft may be removed. The shaft, spring, gear, and washer may then be removed. Temporary blocking may then be placed under the jack drop leg. The roll pin securing the worm drive gear may then be removed. Next, the drop leg and the worm gear from the lower end of the jack tube may be removed. Next, the base that the worm gear rotated in or worm gearing mounting bracket may be removed. Next, the hydraulic cylinder may be fully extended. The drop leg may be reinstalled in the jack housing. The drop leg may be lifted as high as possible and blocked in an upright position. A bolt may be fitted through one of the apertures in the drop leg to secure the ram of the hydraulic cylinder.

Holes may be drilled in the jack housing to accommodate hydraulic lines which are connected to the hydraulic cylinder. Next the electric/hydraulic power unit may be mounted in a weather protected location to increase service longevity. A splitter block or check valve may then be mounted as the particular application may require. Hydraulic hoses may then be installed in a series to complete the proper fluid circuits. The correct hydraulic fluid may then be used to fill the reservoir (e.g. AW-32). The electric power supply may then be attached to the electric/hydraulic power unit.

Although a method of installation is described, it is to be understood that there may be variations in the order in which different steps are performed. For example, it may be more convenient to drill the holes in the jack housing at an earlier time in the process after the worm screw has been removed.

Therefore, a hydraulic retrofit kit and associated methods have been shown and described. Although specific embodiments are shown and described herein, it is to be understood that the present invention contemplates numerous options, variations, and alternatives in sizes and dimensions, variations in materials, and variations in the specific component parts including within a kit.

What is claimed is:

1. A method of retrofitting a crank jack of a trailer with a jack housing and a jack leg into a hydraulic jack, the method comprising:

removing mechanical components from within the jack housing, the mechanical components comprising gearing of the crank jack;

placing a hydraulic cylinder within the jack housing, wherein the hydraulic cylinder comprises a main cylinder and a ram piston extending outwardly therefrom as the main cylinder is filled with pressurized fluid;

securing the hydraulic cylinder by fastening a top portion of the hydraulic cylinder to the jack housing using a fastener inserted through a hole in a platform positioned within the jack housing; and further securing the hydraulic cylinder by fastening the ram piston to the jack leg using a bolt extending through a pre-existing hole in the jack leg.

2. The method of claim 1 further comprising drilling a first hole and a second hole in a side of the jack housing to allow for connection of hydraulic lines to the hydraulic cylinder.

3. The method of claim 1 further comprising placing a top cover over a top end of the hydraulic cylinder and onto the jack housing.

4. The method of claim 1 wherein the fastener is a bolt.

5. The method of claim 1 further comprising connecting hoses to ports on the hydraulic cylinder.

6. An apparatus made by the method of claim 1.

7. A trailer comprising the apparatus of claim 6.

8. A method of retrofitting a crank jack of a trailer with a jack housing and a jack leg into a hydraulic jack, the method comprising:

providing a kit comprising a hydraulic cylinder comprising a main cylinder and a ram piston extending outwardly therefrom as the main cylinder is filled with pressurized fluid;

removing mechanical components from within the jack housing, the mechanical components comprising gearing of the crank jack;

placing the hydraulic cylinder within the jack housing, wherein the hydraulic cylinder comprises the main cylinder and the ram piston extending outwardly therefrom as the main cylinder is filled with the pressurized fluid;

securing the hydraulic cylinder by fastening a top portion of the hydraulic cylinder to the jack housing using a fastener inserted through a hole in a platform positioned within the jack housing; and further securing the hydraulic cylinder by fastening the ram piston to the jack leg using a bolt extending through a pre-existing hole in the jack leg.

9. The method of claim 8 wherein the kit further comprises a top cover, the method further comprising placing the top cover over a top end of the hydraulic cylinder and onto the jack housing.

10. The method of claim 9 wherein the method further comprises securing the top cover.

11. The method of claim 9 further comprising drilling a first hole and a second hole in a side of the jack housing to allow for connection of hydraulic lines to the hydraulic cylinder.

12. The method of claim 11 further comprising connecting the hydraulic lines to a first cylinder port and a second cylinder port.

\* \* \* \* \*